(12) United States Patent
Novotny et al.

(10) Patent No.: US 9,410,850 B2
(45) Date of Patent: Aug. 9, 2016

(54) INFRARED IMAGER READOUT ELECTRONICS

(71) Applicants: Vlad Joseph Novotny, Los Gatos, CA (US); Howard Woo, San Jose, CA (US)

(72) Inventors: Vlad Joseph Novotny, Los Gatos, CA (US); Howard Woo, San Jose, CA (US)

( * ) Notice: Subject to any disclaimer, the term of this patent is extended or adjusted under 35 U.S.C. 154(b) by 224 days.

(21) Appl. No.: 14/032,205

(22) Filed: Sep. 20, 2013

(65) Prior Publication Data

US 2015/0085134 A1 Mar. 26, 2015

(51) Int. Cl.
| | |
|---|---|
| *G01J 5/24* | (2006.01) |
| *H04N 5/33* | (2006.01) |
| *H04N 5/3745* | (2011.01) |
| *H04N 5/378* | (2011.01) |
| *H04N 5/353* | (2011.01) |
| *H04N 5/355* | (2011.01) |
| *H04N 5/357* | (2011.01) |

(52) U.S. Cl.
CPC ... *G01J 5/24* (2013.01); *H04N 5/33* (2013.01); *H04N 5/3535* (2013.01); *H04N 5/3575* (2013.01); *H04N 5/35554* (2013.01); *H04N 5/378* (2013.01); *H04N 5/37455* (2013.01)

(58) Field of Classification Search
CPC .............. G01J 5/24; H04N 5/33; H04N 5/353; H04N 5/3535; H04N 5/357; H04N 5/37455; H04N 5/378
See application file for complete search history.

(56) References Cited

U.S. PATENT DOCUMENTS

| | | | | |
|---|---|---|---|---|
| 6,188,069 | B1* | 2/2001 | Endoh | G01J 5/20 250/332 |
| 6,541,751 | B1* | 4/2003 | Bidermann | 250/208.1 |
| 2007/0075888 | A1* | 4/2007 | Kelly | H03M 1/145 341/155 |
| 2007/0170359 | A1* | 7/2007 | Syllaios et al. | 250/338.1 |
| 2008/0252730 | A1* | 10/2008 | Hong | G08B 13/19 348/155 |
| 2008/0284890 | A1* | 11/2008 | Miyatake | H04N 3/155 348/308 |
| 2009/0121139 | A1* | 5/2009 | Chamming's | G01J 5/22 250/340 |
| 2009/0200466 | A1* | 8/2009 | Mammen | G06T 5/50 250/330 |
| 2010/0238332 | A1* | 9/2010 | Watanabe | 348/300 |
| 2011/0210251 | A1* | 9/2011 | Onakado | H04N 5/33 250/332 |
| 2011/0242378 | A1* | 10/2011 | Mabuchi | 348/296 |
| 2012/0318984 | A1* | 12/2012 | Vanneau | G01J 5/00 250/340 |

\* cited by examiner

*Primary Examiner* — David Porta
*Assistant Examiner* — Jeremy S Valentiner

(57) ABSTRACT

Readout integrated circuits placed underneath the suspended sensing elements detect changes of electrical resistance of sensing elements and digitize the signals with digital to analog convertor for each element. Readout electronics provides low parasitics, high signal to noise ratio, high data rate, high dynamic range and instantaneous global readout.

20 Claims, 8 Drawing Sheets

INFRARED IMAGER READOUT ELECTRONICS

RELATED U.S. APPLICATION DATA

Provisional application No. 61/704,145 filed on Sep. 21, 2012.

BACKGROUND

Micro-Electro-Mechanical Systems (MEMS) microbolometers are wavelength-independent detectors that sense incident electromagnetic radiation by the temperature increase caused by the radiation's absorption in sensing elements. The sensing element includes a temperature-sensing material whose resistivity is dependent on temperature. The temperature (or rather temperature change) of the element then can be read-out by measuring the resistance of sensing element using associated pixel readout integrated circuit. Detectors can be used as a single pixel to detect temperature or arrayed in a focal plane array to form an image.

Microbolometers are typically optimized to detect infrared wavelengths in the 2-14 µm region where traditional photonic sensors are insensitive (as in the case of silicon-based charge-coupled device (CCD) or complementary metal-oxide semiconductor (CMOS) image sensors) or expensive to fabricate (as in the case of quantum-well devices). They can be used in cameras that have applications in night vision, surveillance/security, medical imaging, and search and rescue. Alternatively, a single pixel or small pixel array can be used for non-contact temperature sensing in mobile phones and other devices.

Relative to visible light imaging, infrared (IR) imaging using MEMS microbolometers suffers serious shortcomings in image and video performance. In addition to the fact that current IR imaging greatly lags visible imaging in resolution, modern IR imagers exhibit insufficient dynamic range and insufficient grey-scale allocated to areas of interest such as human subjects or other warm objects. In scenes with motion, scrolling shutter artifacts occur such as wobble, skew, smear, partial exposure, and aliasing. Because of readout and sensor limitations, capture times are long and consequently, frame rates are low. Finally, de-noising, image enhancement, and image post-processing are inadequate. While performance of the microbolometer structure itself has made advancements with new designs, materials and fabrication methods, implementation of improved readout technology has yet to follow to match sensor gains.

Furthermore, although infrared imaging using microbolometers has found widespread applications in military, industrial and consumer products, their use has generally been limited to high-cost, low-volume products primarily because of the high cost of the microbolometer imager itself, which can account for about 50% of the total imaging system cost. Major contributors to the imager cost are the relatively large pixel size required to achieve acceptable device sensitivity and typically high yield loss due to pixel to pixel performance variation (among other contributors). State-of-the-art microbolometer pixel pitch is currently 17 um, or roughly 200 times the area of state-of-the-art visible-light CMOS image sensor pixels. Such relatively large pixel size results in a large array area, a large die size, and therefore fewer die-per-wafer, lower yields and high cost. Furthermore, a large array necessitates larger optics and optical paths which contribute to larger and more expensive systems. Therefore, improved yield and smaller pixel size can reduce imager and system costs in various ways enabling adoption of microbolometer infrared imaging into more price sensitive and higher volume products.

SUMMARY

Design, architecture, and implementation of readout integrated circuitry that is capable of detecting and measuring very small changes in resistance (and consequently small changes of voltage or current) in a sensing element such as a MEMS microbolometer is disclosed. The pixel readout integrated circuit performs the analog signal sampling and subsequent Analog to Digital Conversion (ADC) at high-frequency while maintaining a footprint of less than 100 square microns. The small pixel readout circuit footprint allows its implementation within each single pixel (pixel-level ADC) of a microbolometer focal plane array enabling improved and novel capabilities including:
1) Fast readout and multiple image captures
2) Global shutter capability
3) Expanded dynamic range where needed
4) Pixel-by-pixel calibration and compensation
5) Improved noise reduction process, especially 1/frequency (1/f).

Fast sampling and frame capture in conjunction with global shutter that are uniquely possible with pixel-level ADC allow high frame rates and reduced motion artifacts enabling motion and gesture sensing applications such as automotive night vision and gaming.

Fast sampling also enables the unique capability of initial sub-sampling of each pixel and subsequent dynamic setting of the integration time on a pixel-by-pixel basis within the period of a single frame. Therefore, the integration time for each pixel can be customized during each frame, based on the pixel's brightness. This allows expansion of the dynamic range around any region of interest. Memory registers used for storage of individual pixel integration times can also be linked to non-volatile memory registers that store the predetermined ADC schedules which map the Digital to Analog Conversion (DAC) voltage sub-ranges to the different integration time. The schedules are based on the average IR intensity level, contrast, type of scene, and different applications. These values are also adjusted during a power-on calibration routine using a shutter. In this manner, pixel response can be calibrated on a pixel-by-pixel basis, thereby compensating for variation arising from fabrication. Such compensation reduces one of the main sources of chip-sort yield loss.

Finally, fast sampling, frame capture, and storage are essential for noise cancelation and reduction using auto-correlation methods in which a pixel is probed at a sufficiently short interval such that there should be no appreciable readout value change due to actual radiation absorption. Therefore, any readout value change between very short intervals is the result of sensor or readout noise. Such noise power can then be identified and filtered.

DETAILED DESCRIPTION

This description relates to design, architecture, and implementation of imaging devices based on Micro-Electro-Mechanical Systems (MEMS) microbolometer sensing elements integrated with CMOS readout circuits. The invention specifically relates to design, architecture, and implementation of a readout integrated circuit that has significantly improved performance and yield of the associated imager.

Microbolometer detectors sense incident electromagnetic radiation by the temperature increase caused by the radiation's absorption in a sensing element. The sensing element includes a temperature sensing material whose resistivity is dependent on temperature. The temperature change of the element is related to the flux of radiation incident on the element and can be read-out by measuring the resistance change of the sensing element using the associated pixel readout circuit. Either a constant current or constant voltage source converts this resistance change to a readout voltage or current respectively. This resultant voltage or current is integrated in a capacitor for a certain time period called the integration time. The resulting capacitor charge or voltage is then sampled and converted to a digital signal through an ADC.

Figure 1:
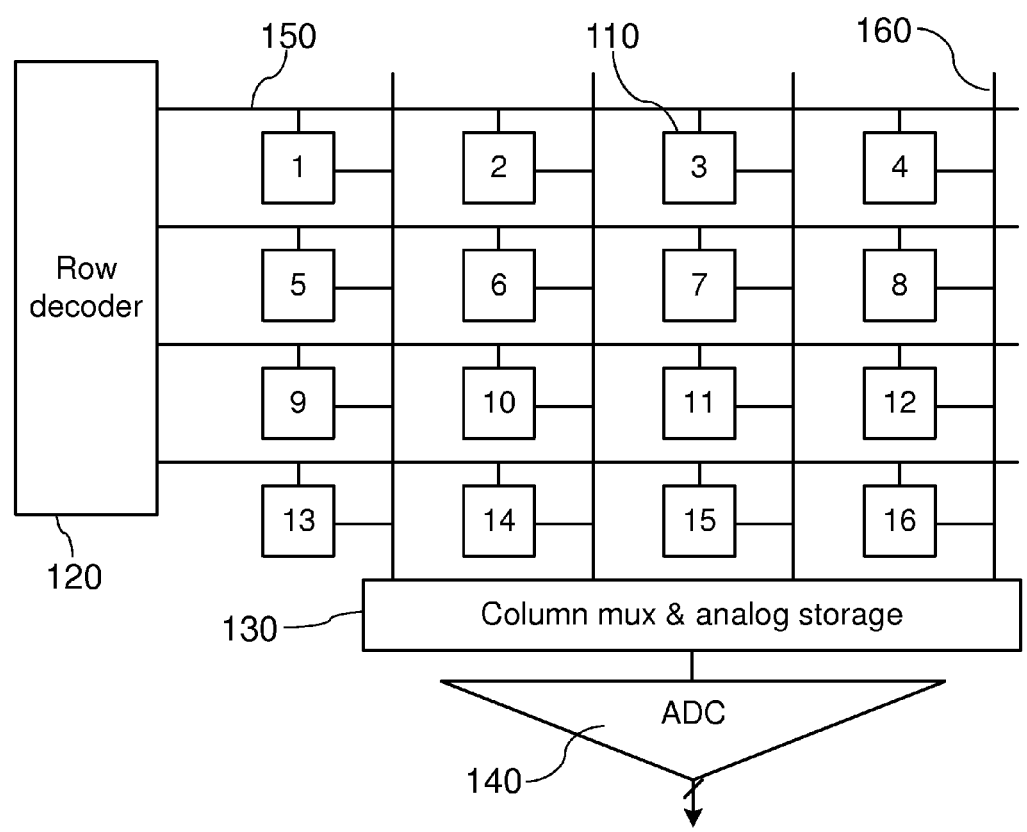
FIG. 1 shows a block diagram of a prior art array-level ADC readout architecture.

An infrared imaging array is comprised of a number of pixels that are arranged typically in a two dimensional array as schematically shown in FIG. 1. The individual pixels are further comprised of sensing elements and readout integrated circuits built on a substrate. The sensing elements are typically microbolometer MEMS structures suspended above the substrate and encapsulated in vacuum or low pressure environment with a window transparent to electromagnetic radiation. The preferred fabrication method uses monolithic integration of the readout integrated circuits that are built on the substrate first, followed by microbolometer MEMS sensing elements placed above integrated circuits.

Array-level ADC architecture, depicted schematically in FIG. 1, is a prior art approach for arrayed image sensor readout. In this method, one or a few ADCs 140 are used to readout the whole array, and pixels are readout one-by-one, serially, limiting the frame rate and number of pixels (array size). Here, the pixels 110 are electrically connected to the row decoder 120 by the set of electrical lines 150 and to column multiplexer 130 by another set of electrical lines 160.

Figure 2:
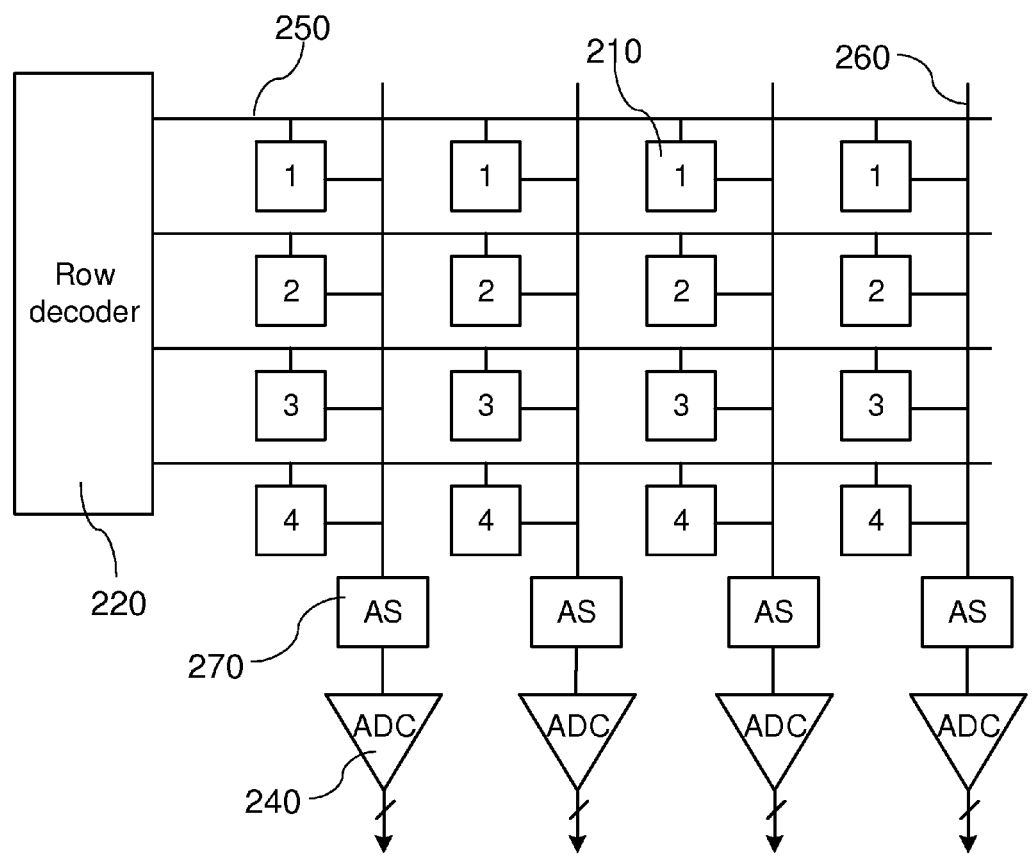
FIG. 2 shows a block diagram of a prior art column-level ADC readout architecture.

In visible-light image sensors, column-level ADC is often implemented, as shown schematically in FIG. 2. In this case, the pixels 210 are again interconnected with the set of electrical lines 250 to the row decoder 220 in the similar way as in array-level ADC architecture. Pixels 210 are also interconnected with another set of electrical lines 260 to analog storage circuitry 270 which are in turn connected to the column-level ADCs 240. This improved prior art architecture allows simultaneous readout of signals from all columns for a single row, increasing readout speed over array-level ADC. The same column-level processing method can be applied to microbolometer-based image sensors. While this accommodates increasing array size and higher frame rate to some extent, the frame rate is still limited to the single ADC time multiplied by the number of rows. This practically limits the maximum frame capture rate to the imager refresh rate which is typically less than 60 frames per second, leaving no room to perform oversampling that is needed to process extra noise filtering and dynamic range extension. In addition, the readout time is a function of the array size, so large arrays also require faster ADC that consume higher power and result in higher noise.

Figure 3:
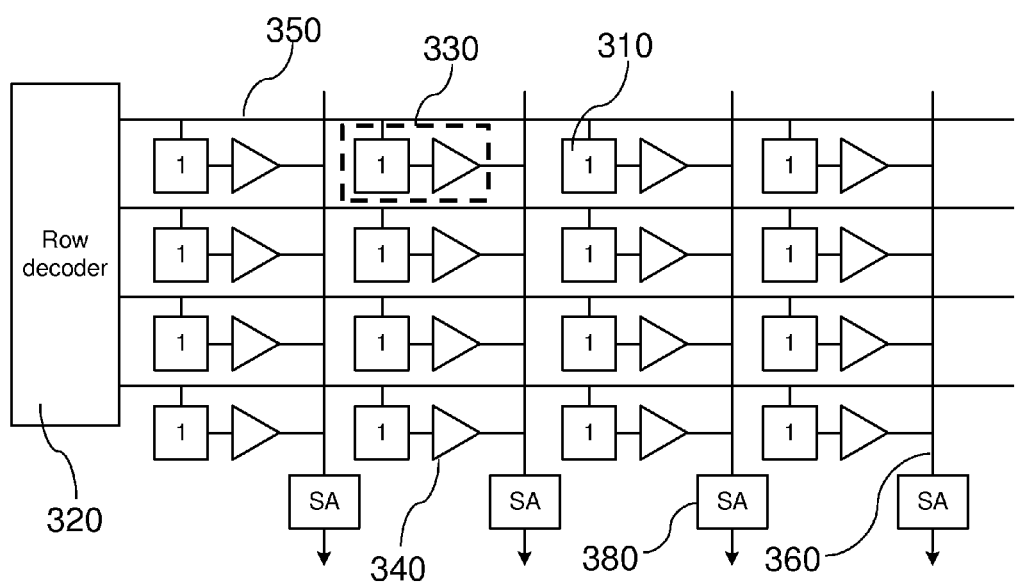
FIG. 3 shows a block diagram of pixel-level ADC readout architecture.

The block diagram of pixel-level ADC architecture is illustrated in FIG. 3. The pixels 330 are again interconnected to the row decoder 320 with the set of interconnecting electrical lines 350. Each sensing element 310 within a pixel is also connected to its own analog front end circuit and an ADC 340. The analog front end circuit is comprised of a resistance-to-current (or voltage) converter and a track-and-store circuit. The readout of each ADC is enabled through the bit lines 360 and sense amplifiers 380. It should be understood that the sensing element 310 occupies the whole area of a single pixel and that the interconnecting electrical lines 350 and 360 and the analog front end circuits and ADCs 340 are stacked below the sensing element. Performance improvements are achieved by including ADCs with each sensing element, as illustrated in FIG. 3.

For microbolometer-based infrared imaging, the minimum pixel size is limited by the microbolometer sensing element size. Sensing element size is limited by diffraction when the pixel dimensions approach the wavelength of detected electromagnetic radiation and by sensitivity losses caused by increased noise arising from small sensing elements. Currently, state-of-the-art pixel pitch is 17 um and is generally expected to shrink to the diffraction limit of 10-12 um in the future. Such a pixel size is relatively large in comparison to visible-light pixels, giving additional flexibility to readout circuit implementation in the area underneath the individual sensing elements.

For example, in visible-light sensors, the photodiode sensing element area is generally shared with a readout circuit, limiting readout circuit footprint to a fraction of total pixel area. Furthermore, in visible-light imagers, the pixel readout circuit area limitation is further constrained since the routing of interconnect metal lines must not obscure the photodiode from incoming light. For microbolometers, the entire pixel area is available for pixel readout integrated circuit implementation and is not constrained by or competing with the sensing element area since the sensing element is stacked vertically above the pixel readout circuit.

Because of relatively large pixel size and the out-of-plane physical separation of the pixel readout circuit from the sensing element, the silicon area under the sensing element is generally not fully utilized. In one embodiment of the invention, methods are described to use this area by placing parts of the ADC circuitry in the pixel readout circuit such that each pixel has its own ADC functionality. Therefore digitization of signals from all pixels can be performed simultaneously.

Figure 4:
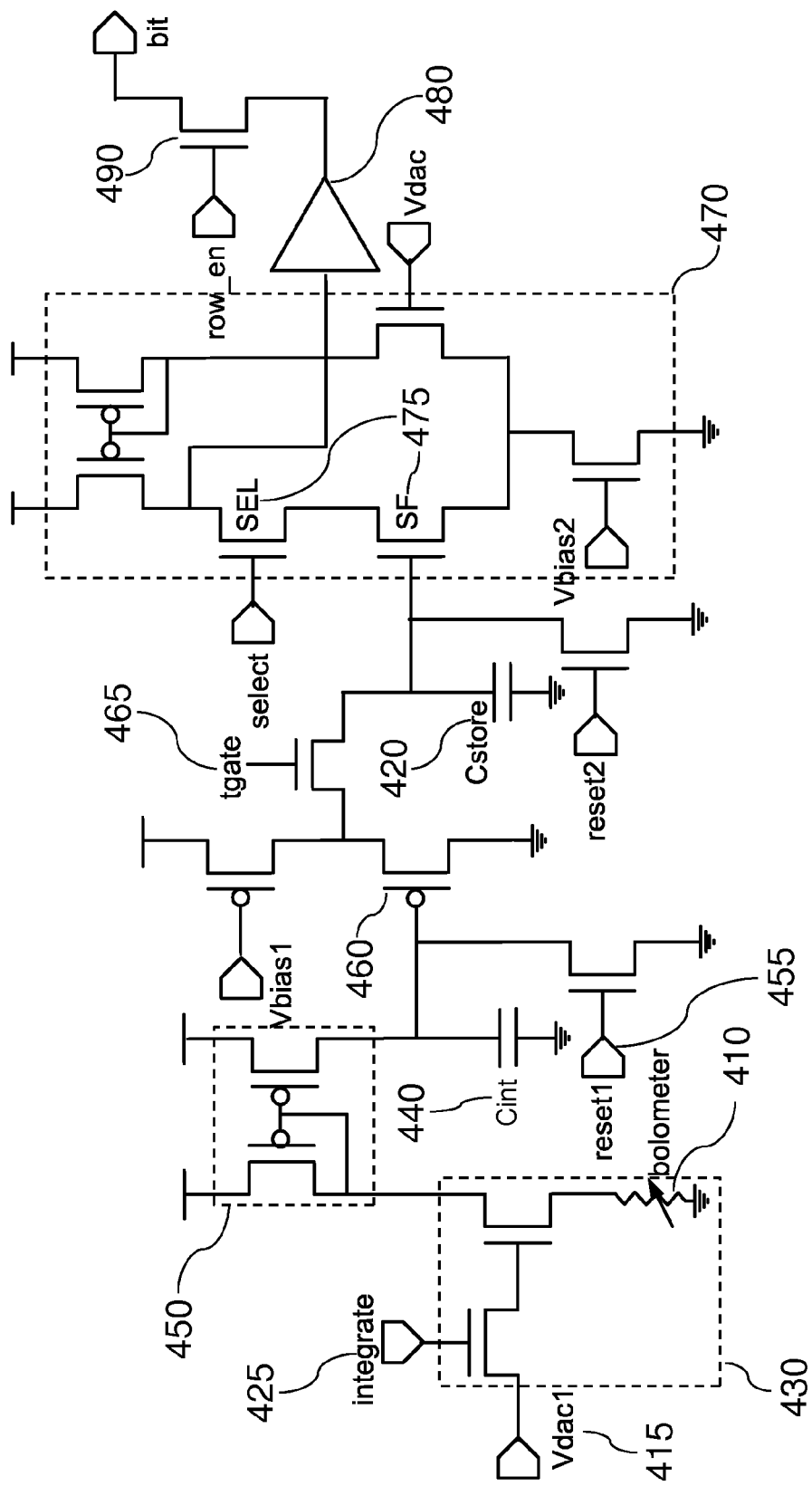
FIG. 4 shows a diagram of a pixel readout integrated circuit based on constant voltage architecture.

FIG. 4 shows the pixel-level readout integrated circuit diagram based on the use of a constant voltage source. At the beginning of frame capture, the integration capacitor, Cint 440 is reset through a reset switch and the control signal, reset1 455. A control signal then triggers the integrate switch 425. The constant voltage source, Vdac1 415, then generates a current through a voltage-to-current converter (V2I) 430. The current is proportional to the variable resistance of the microbolometer sensing element 410. The voltage source 415 is a programmable DAC output that is common to all pixels so that the gain from the bolometer resistance to the V2I output current range can be varied. For example, if the sensing element 410 resistance changes are small, a larger output current can be generated by raising the input voltage thereby improving the signal-to-noise ratio of the output current. The V2I 430 in this drawing is based on the source follower topology, but can be implemented using other configurations, such as a voltage follower which can be constructed by a unity gain amplifier with negative feedback.

The V2I 430 output current is duplicated using a current mirror circuit 450 and the charge from this mirrored current is accumulated in an integration capacitor, Cint 440. The voltage of the capacitor 440 reflects and is inversely proportional to the resistance of the bolometer 410 until the capacitor voltage is saturated. One advantage of charge integration is that it acts as a low pass filter that smoothes out random noise generated by the pixel readout circuit and the sensing element.

The voltage stored in Cint 440 is level shifted by a source follower 460 without disturbing the charge stored in Cint 440 or the integrating operation. Since the Cint 440 charge is undisturbed during sampling due to the current mirror 450, multiple samplings over a single integration period are possible. Therefore, a sensing element could be probed initially at the beginning of an integration period to determine its intensity, and subsequently, the total integration time and bit precision can be set dynamically and on an individual pixel basis. Consequently, customized integration times for each pixel could be used to extract sufficient signal from low intensity pixels or to expand the readout precision (dynamic range) around any particular intensity value.

Finally, the voltage is sampled and stored in a capacitor Cstore 420. The sampled voltage in Cstore is compared with the pre-scheduled reference signal that is coming from DAC. The comparator consists of a differential gain stage 470 followed by a single ended gain stage 480. Once the Cint voltage is sampled and stored, the transmission gate 465 to Cstore 420 is closed and the voltage is kept until all pixels are read out through the comparator 470+480 and bit line. Since all Cstore 420 capacitors in an array can be sampled and stored at the same time, the pixel frame data is captured simultaneously and globally thereby embodying a global shutter.

In FIG. 4, the sharing of a part of differential amplifier 470 (all except SEL and SF transistors 475) as well as the following stage amplifiers 480 by multiple pixels is shown in order to reduce the circuit area, power consumption, and artifacts caused by component parameter mismatch.

If multiple samples per frame are not needed, the storage capacitor 420 can be omitted for a global frame capture. The integration capacitor 440 is sampled in lieu of the storage capacitor 420, and the output is fed into the bit line through a source follower directly.

Figure 5:
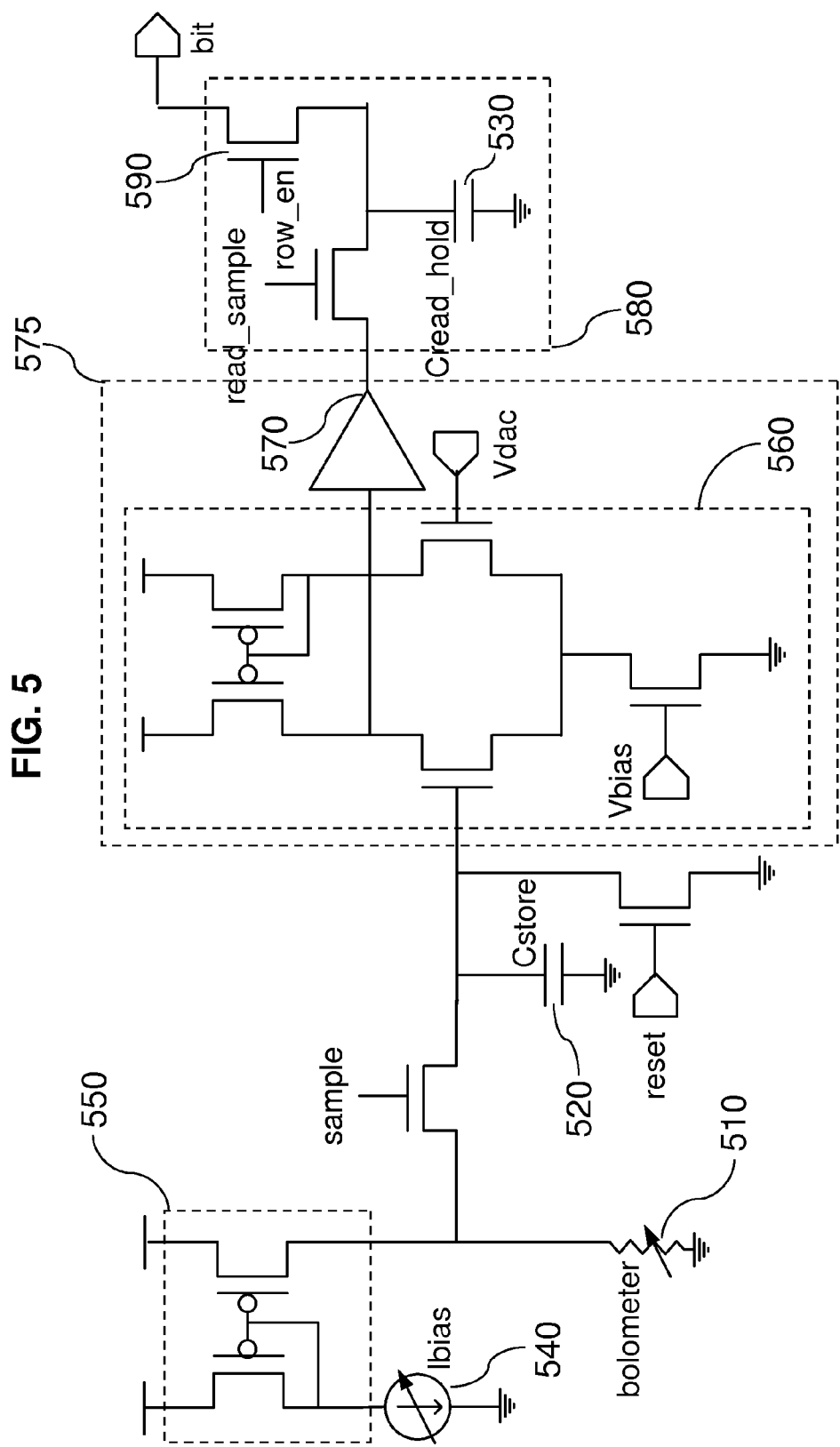
FIG. 5 shows a diagram of a pixel readout integrated circuit based on constant current architecture.

FIG. 5 is a diagram of a pixel readout integrated circuit based on use of a constant current source Ibias 540. In this configuration, the current generated by source 540 is duplicated using a current mirror 550 resulting in an identical current that is then driven through the bolometer sensing element 510. The current driven through the sensing element generates an instantaneous voltage across the element called the output voltage. Similar to the constant voltage circuit described in FIG. 4, this current source 540 is a programmable current DAC output that is common to all pixels. Therefore, the gain from the sensing element's 510 resistance to the output voltage can be varied. If the overall sensing element's resistance changes are small, a larger output voltage can be generated by raising the input current such that the output voltage has a higher signal-to-noise ratio.

In this configuration, unlike the circuit in FIG. 4, the output is not integrated, rather the sampling is done at the instantaneous voltage and the sampled charge is stored in a storage capacitor, Cstore 520. Since Cstore 520 samples the instantaneous voltage, multiple samplings over a single image frame time are possible. The sampled voltage in Cstore is compared with the pre-scheduled reference signal that is coming from DAC 640 in FIG. 6. The comparator 575 consists of a differential gain stage 560 followed by single ended gain stage 570. The digital output of the comparator is then stored in the Cread_hold capacitor 530. The storage element 580 containing Cread_hold has the same structure as a dynamic random access memory (DRAM). When an analog data is sampled and held in Cstore 520 for each binary bit plane, from most significant bit (MSB) to least significant bit (LSB), the sampled analog data is compared with the reference signal from DAC and the resulting bit, 0 or 1, is determined. Since the sequence of the reference signal coming from DAC is assumed to be from MSB to LSB, the scheduling of the digital inputs to DAC should follow this sequence. The bit is then stored in Cread_hold 530. For a complete ADC operation, the MSB requires only one comparison, while the LSB bit plane requires multiple comparisons to determine its state. If a plurality of the storage elements 580 is implemented, a multiple bit-plane data can be stored. By storing all bits for a single pixel from MSB to LSB in a plurality of storage elements, a whole frame buffer with the raw data now resides inside the pixel array, thus reducing complexity and number of circuit components. The stored bit sequence is then read out by sense amplifiers 650 in FIG. 6 sequentially row-by-row. Although the example shown here is based on a binary sequence, a ramp signal from DAC can be used as a reference signal. In this case the digital input to DAC, most commonly Gray coded, is mirrored to all pixels. Consequently, when the input signal matches the reference signal, this input code can be stored in a plurality of in-pixel storage elements.

When the ADC operation starts, the result of each binary weighted bit comparison is stored in Cread_hold capacitor 530, where the stored value is a digital binary number instead of an analog voltage representing the instantaneous sample of the integration capacitor. Since the stored value is digital, the leakage of the Cread_hold 530 capacitor which is placed after the pixel comparator does not affect the outcome as much as it does in an analog output system. Furthermore, the sampled analog value of the storage capacitor 520 itself does not need to be transferred. Thereby, the system signal to noise ratio will not be affected by artifacts created during the capture and transfer of analog signals.

After reading out a single bit plane, ADC moves to the next most significant binary bit comparison until all bits are compared and the outputs sent out. The DAC outputs can also be thermometer coded in order to reduce the switching noise. In FIG. 5, while the bit lines are being read out, the current sources to the differential amplifiers 560 can be switched off in order to save power. If a plurality of storage elements 580 is implemented, all comparator outputs can be stored in the pixel, and a complete bit plane data can be read out at the same time.

The main consideration for pixel-level ADC architecture is that conversion time should be sufficiently fast. The conversion time can be as fast as tens of microseconds at an ADC precision of 10 bits. If more precision is needed, the conversion time doubles per each additional bit.

In this pixel-level ADC embodiment, the total readout time is simply the single ADC conversion time plus the column readout time multiplied by the number of rows since there is a single sense amplifier 380 per column to read the digital output from a bit line. The speed of the ADC operation is limited by the number of comparison steps, the DAC signal settling time, the speed of the comparator, and the sense amplifier settling delay. Since each pixel contains a comparator 575, the comparator delay is lower than that of a shared comparator where multiple source followers are connected in parallel resulting in larger loading.

The sense amplifier 380 settling delay can be minimized especially if it is current switched. Since the sense amplifier operation in the column readout can be done at the rate of tens or hundreds of millions samples per second, readout rate is not limited by column readout.

If the pixel DAC input to the comparator is required to settle to 95% of the target value, the settling time may be as high as hundreds of nanoseconds since the DAC has to drive many nanoFarads of loading. Thus, if limited by DAC settling delay, the total ADC operation might take as much as 0.1 msec (1000 thermometer code steps×100 nsec) per frame. This apparently limits the readout frame rate to ten thousand frames per second.

To improve conversion speed, either the DAC settling time needs to be shortened or the number of conversion steps should be reduced. The settling time can be minimized by optimizing the DAC driver, the wire loading, and the input capacitor of the comparators. To reduce the number of ADC conversions, the binary search method can be applied. This method reduces the number of conversion cycles to a half compared to a thermometer-coded conversion. For example, a single slope or thermometer coded 10 bit ADC will require 1024 conversion cycles, while the binary search method will require 512 conversion cycles. The trade-off is higher noise due to large step change.

The pixel-level ADC transfers a digital signal through the bit line, unlike in the array-level and column-level ADCs. This reduces the error caused by readout noise introduced by charge sharing and the settling time that occurs when analog signal is transferred through the bit line in shared ADC architectures. Finally, since the readout for pixel-level ADC is done for all pixels simultaneously, the readout time is independent of array size thereby enabling large arrays without impact on frame rate.

Although the nominal sensor resistance value is fixed once the chip is fabricated, the amount of charge delivered to the integration capacitor, Cint 440, can be programmed to optimize sensor performance for each pixel when applying pixel-level ADC architecture. Specifically, the value of the constant current or voltage that converts the bolometer resistance change into voltage or current pulses can be adjusted on a pixel-by-pixel basis affording unique capabilities and advantages. These constant bias currents or voltages, can affect the sensor performance in the areas of 1) time constant, 2) electrical dynamic range, 3) noise performance, and 4) power consumption.

Microbolometer sensitivity is limited by the sensor's noise performance—specifically 1/f noise originating from the sensor material and small volume of that material used as the thermistor (a resistor that changes its resistance with temperature). The problem is particularly severe in microbolometer technology and mitigating this problem has been one of the main challenges of the microbolometer IR imagers. New sensor designs and materials have been the focus to reduce 1/f noise, but novel electronic readout approaches can be also beneficial.

The relationship between the reference voltages versus the detector's ultimate sensitivity—the noise equivalent temperature difference (NETD)—is such that the higher the sensor bias voltage, the lower the temporal NETD. However, the higher the voltage across the microbolometer is applied, the higher the current flow through the microbolometer becomes, resulting in undesirable self-heating effects and higher overall power consumption. Hence, the optimal bias voltage setting will be a trade-off between the low noise and low power consumption. As shown in the pixel circuit diagram in FIG. 4, the bias voltage 415 across the microbolometer sets the integration current Iint. This can be approximated as follows:

$$Iint = (Vin\_bias - Vt\_sf)/Rb$$

where Vin_bias is the input bias voltage,
Vt_sf is the threshold voltage of the source follower and,
Rb is the resistance of the microbolometer The same principle can be applied to the pixel system depicted in FIG. 5. In this implementation, a constant current 540, instead of constant voltage, is applied to the microbolometer 510 which is equivalent to a variable resistor. As mentioned above, the higher the current flows through the microbolometer and the higher the dynamic range of the voltage output and the signal-to-noise ratio will be.

Figure 6:
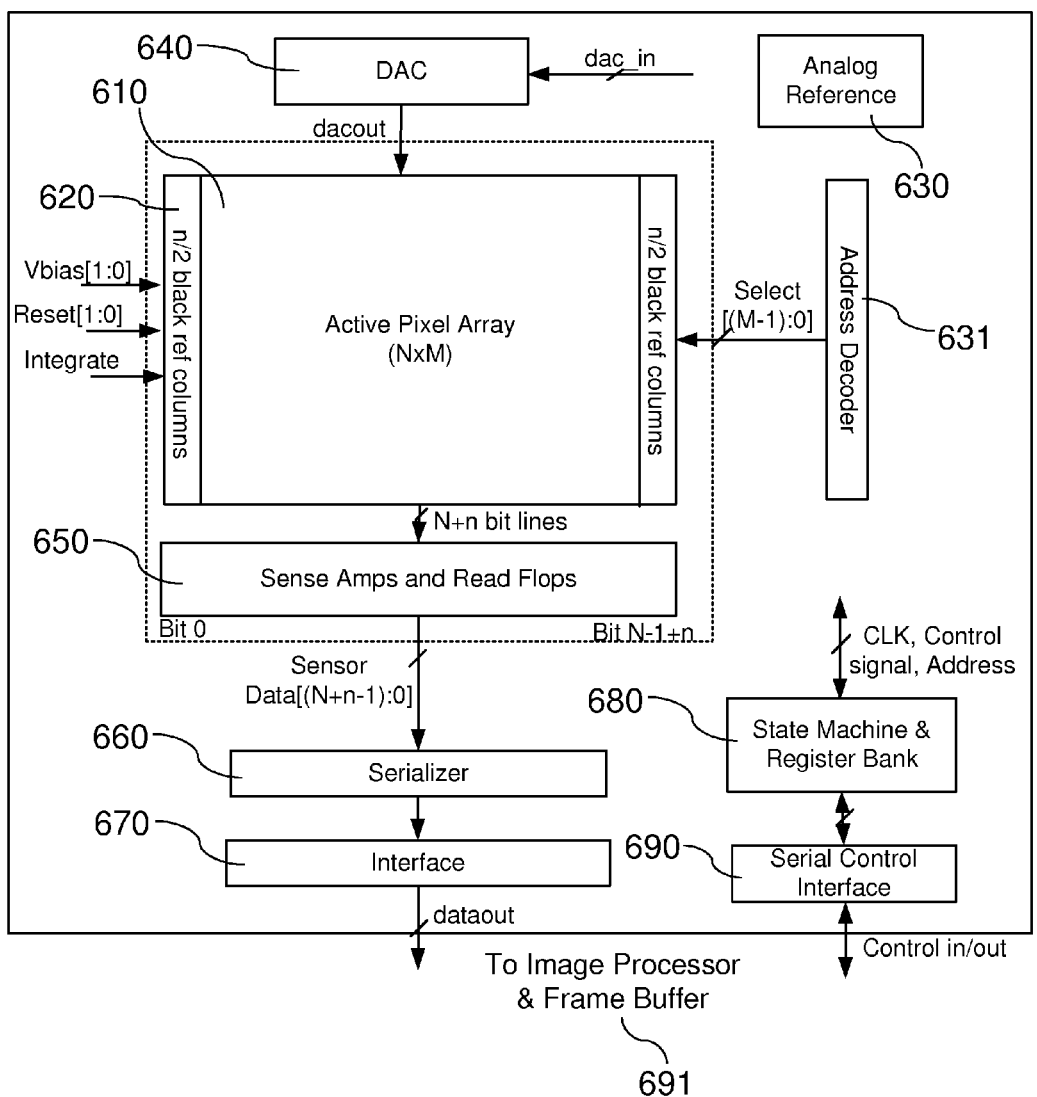
FIG. 6 depicts a block diagram of control logic circuit with a microbolometer array, pixel-level ADC, a common DAC, and other interface blocks.

The microbolometer system with the control logic circuit and the pixel array is shown in FIG. 6. The active (N×M) pixel array 610 is surrounded on two sides with n/2 black reference columns 620. Analog voltage reference 630 in conjunction with DAC 640 provides voltage reference signals to the pixel array 610 and black reference columns 620. The data from the readout integrated array circuits of FIG. 4 or 5 are transferred to sense amplifiers 650 row by row selected by the address decoder 631. That data is serialized in 660 and transferred out into the image signal processor (ISP) and frame buffer 691 using the high speed serial interface 670. The system is controlled by the serial control interface 690 and state machine through the register bank 680 that provide the clocks, control signals and addresses. This system also includes signal correcting and processing unit that has memory containing thermal sensitivity of all elements and algorithms to interpolate between nonfunctional elements.

Pixel-level ADC can compensate on a per pixel basis allowing extremely hot or cold pixels to be adjusted for using an extended bias current or voltage range. Since input voltage (or current) levels affect the dynamic operating range, noise and power levels, the average, max and mean output levels are measured or calculated over temperature range, and the optimal input levels are derived from these values.

Figure 7:
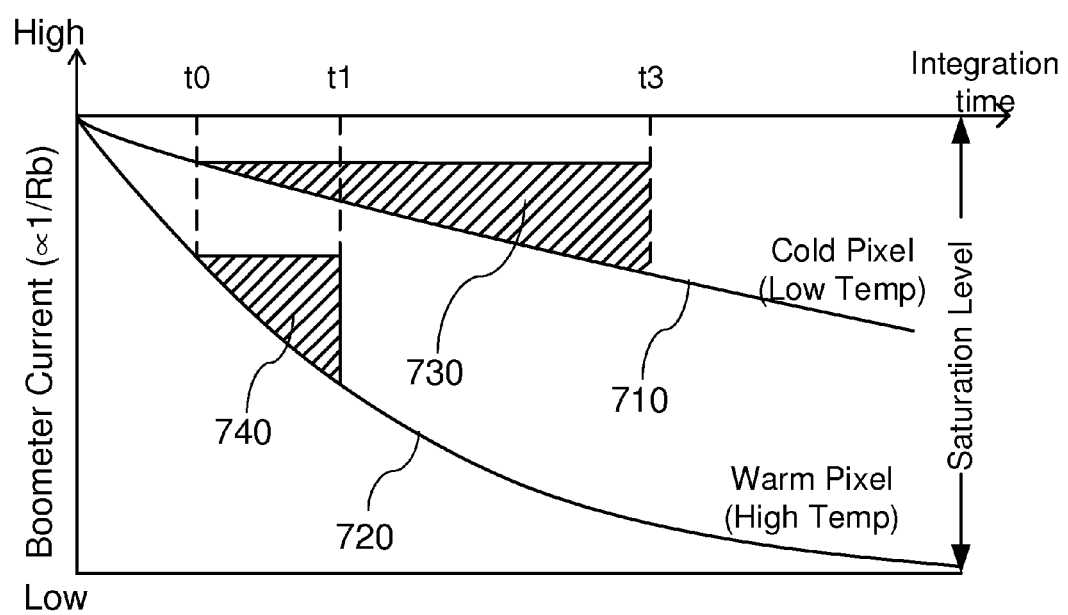
FIG. 7 shows the inverse of resistance of a microbolometer sensing element over time under various illumination intensities.

The charge integration method of operation is described in FIG. 7, where the curves represent the inverse of the sensing element's electrical resistance (Rb) over time under various intensities of incident electromagnetic radiation. Since a constant voltage source is assumed in this example, the inverse of Rb is proportional to current through the sensing element. The dependence of 1/Rb versus integration time is schematically represented by the curves 710 (and 720) for a pixel receiving low (and high) intensity of electromagnetic radiation, resulting in cold (and warm) pixels respectively. Therefore, the charge integrated in the capacitor 440 is represented as shaded areas of the curves 730 and 740. The shaded area 740 shows the charge integrated from the time t0 to t1 on a pixel receiving a high flux of light (warm pixel). The shaded area 730 shows the charge integrated for a longer time from t0 to t3 on a pixel receiving a lower flux of light (cold pixel). The actual shape of the curves will be dependent on the sensing element's material and geometry.

In the preferred embodiment, the charge stored in the integration capacitor 440 is not shared nor perturbed by the sampling operation. Instead, it continues to accumulate until the frame reset operation. The integration capacitor can be continuously sampled for further processing in this multi-sampling approach. The charge sampled in the storage capacitor Cstore 420 or 520 does not change during the ADC and readout operations, and therefore can be frequently sub-sampled during an integration cycle, or frame time, allowing complex functionality such as dynamic range expansion and noise reduction via autocorrelation.

In traditional readout using linear dynamic range, a single image frame contains signals ranging from the highest to the lowest value of the dynamic range occupying the full range of ADC. In one embodiment, pixel-level ADC architecture is used to expand the dynamic range using the multi-sampling capability described above. In this example, as depicted in FIG. 4, all integration capacitors 440 are reset, then start integrating at the same time, but each pixel has a unique integration time based on the pixel's responsiveness and its brightness in the image as determined by sub-sampling the pixel. This is done by the pre-programmed DAC output level that is compared with the storage capacitor 420 values; the resultant comparator output 480 is read out. If the output changes the polarity for a particular pixel—the flag value changes from 0 to 1—and the DAC input values are stored in the corresponding frame buffer location along with the status bit. For this pixel, the frame data is extracted. However, for the rest of the array for which the status bits are not set, the ADC operation continues until all the pixels are compared with the entire DAC range.

In a standard approach, the ADC operation is done as fast as possible from one bit to the next at a fixed time interval giving a linear, uniform dynamic range. However, in this embodiment, the dynamic range can be expanded for a certain region of interest by extending integration time intervals and thereby providing more bit depth for pixels having intensity within this region of interest.

Figure 8:
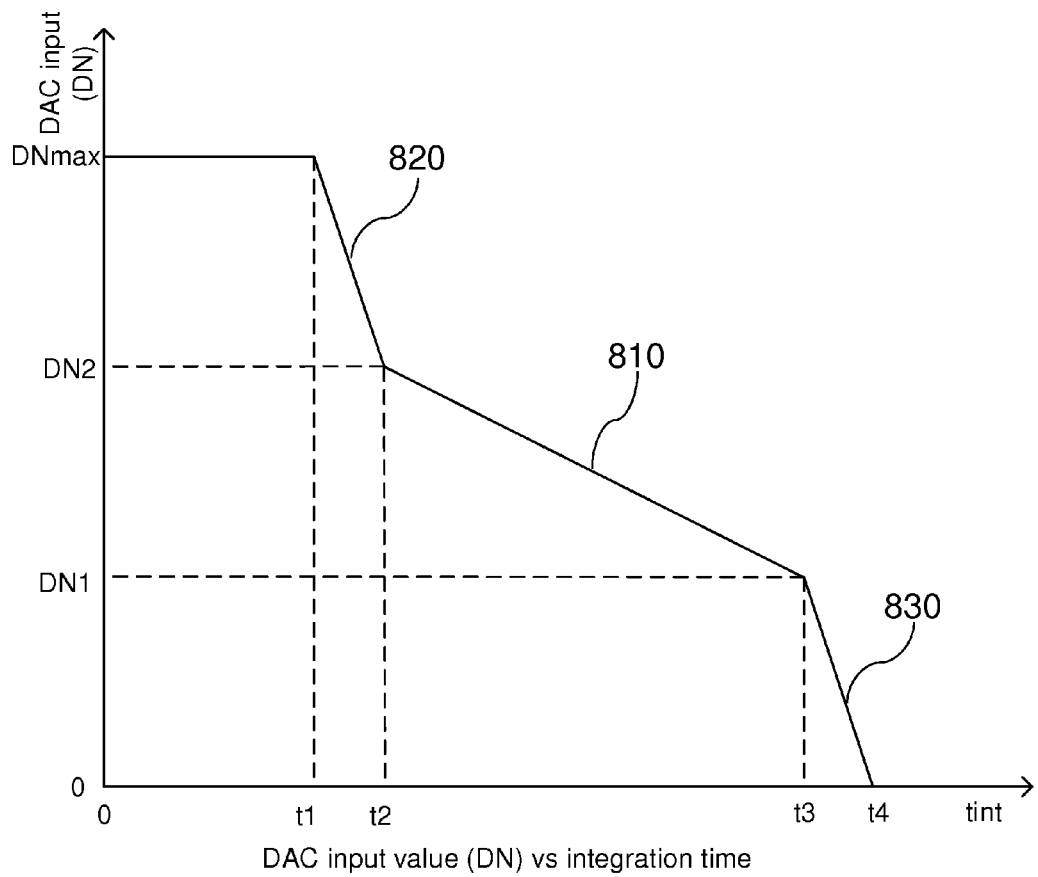
FIG. 8 shows a configurable DAC schedule for various integration times.

Expansion of the dynamic range for a region of interest is depicted in FIG. 8 where the DAC input is plotted against the integration time. In this diagram, the DAC input value represents the average rate of resistance change of the sensing element during a given sampling interval. For pixels having a resistance rate of change within a region of interest (e.g. DN1 to DN2), the bit precision and hence dynamic range for the readout can be expanded by extending the integration time. In FIG. 8, the ADC samples from t1 to t2 820 (from DN2 to DNmax) are taken as fast as possible deemphasizing this range and providing less bit depth in this region. The same deemphasizing is represented for region 830 from t3 to t4. However, for a specific region of interest 810, sampling is done at a longer incremental time step t2 to t3.

Theoretically, time intervals can be set arbitrarily, so that the degree of dynamic range expansion for a given region is done at any precision. Although ADC's comparison steps for t1 to t2 and t3 to t4 are performed as fast as possible, the delays between the bit comparisons can be compensated in the slope calculation. Once all the bits of a full DAC range are compared and all frame buffer locations are filled, the current frame capture is completed. Then the next frame capture starts and the same procedure is repeated again.

Noise in a microbolometer array is mainly comprised of fixed pattern noise, 1/f noise and thermal noise. In the following embodiments, three noise reduction solutions are proposed—digital Correlated Double Sampling (CDS), signal averaging, and 1/f noise reduction based on autocorrelation and adaptive filtering. Each of these methods complements the shortcomings of the other methods. In particular, for sensors with pixel-level ADC, these methods are much more effective due to multisampling and high frame capture rate.

Analog and digital signal processing both during and after the images are captured and stored can be applied to reduce image noise. For signal processing and noise filtering, CDS or autocorrelation techniques can be used. CDS, which itself is a simple autocorrelation technique, can correct 1/f noise only to a limited level. Other autocorrelation techniques are especially promising if a high level of noise cancellation is required.

High pixel sampling rates possible with pixel-level ADC uniquely enable effective autocorrelation for 1/f noise reduction. In order to fully utilize the autocorrelation technique for the 1/f noise cancellation, the sampling rate needs to be high—the sampling bandwidth should be wider than the 1/f noise frequency spectrum, so that the result will cover the entire 1/f noise bandwidth.

In this embodiment, the following CDC procedure is used.
i) With the shutter closed, after settling time, a voltage across the microbolometer element 410 in FIG. 4 is sampled and stored in the integration capacitor, Cint 440. The store capacitor, Cstore 420 voltage is read out through a pixel-level ADC and the digital outputs are stored in a memory array. The row by row readout continues until the last row is complete. This completes the capture of the reference frame.
ii) Cstore 420 is reset and all pixel current sources including the microbolometer current mirror and the bias current mirrors for the amplifiers are powered down. This will reduce the power consumption and prevent the devices from accumulating noise.
iii) After a preset integration time, the current sources are powered on, the track-and-store operation is repeated and the current store and ADC conversion procedure is completed. The previously stored value is then subtracted from the new digital value. This sequence is repeated for next read until finishing the entire frame. In a multisampling system, the second and third procedures are repeated, and the dark value stored in the memory is subtracted again from the newly captured values. The difference accounts for the net current change due to the temperature change in the bolometer as a result of exposure to light. All other background signals including the differences in resistance from one bolometer element to another, capacitor mismatch, thermal noise and variations in amplifier gain are cancelled out. Although this scheme will mainly subtract the fixed pattern noise, it also reduces some white noise.

Advantages of the digital CDS proposed in this embodiment include being free from errors caused by mismatching of two or more capacitors and other noises incurred during readout including the current leakage from the capacitors and extra charge coupling during conversion.

Although the CDS scheme cancels the fixed pattern noise and reduces the white noise including 1/f noise like DC offsets and low frequency noise, its effectiveness with regards to 1/f noise is limited and dependent on the bandwidth of the sampling frequency. If the sampling frequency is lower than the corner frequency of 1/f noise density function, the high frequency noise will not be corrected.

In order to address the shortcomings of CDS and reduce any residual noise after CDS, extra post-process digital filtering is proposed. A simple and popular filtering scheme is signal averaging, which smoothes out all high frequency noise, however, averaging causes blurring of sharp edges.

Since the temporal noise, including the 1/f noise, is time-variant, the frame by frame data are stored and processed, where the pixel-to-pixel values in fixed time interval are compared, averaged and filtered. Averaging, which has normally bandpass nature, will reduce the high frequency noise and is effective in reducing noise such as thermal noise but is not as effective in reducing 1/f noise. Reduction of residual 1/f noise after CDS is achieved by a post digital noise filtering based on adaptive filtering and autocorrelation function.

A method is implemented as follows. First, the noise signal spectral density is calculated based on autocorrelation method. Discrete Fourier Transform of the power spectrum density is the autocorrelation function. If temporally separated by sampling period, the pixel values are stationary, and the autocorrelation function values should be 1. If the sampling frequency is fast enough, captured scenes won't change much, and the autocorrelation function will still be close to 1. If any white noise is added to the signals, the autocorrelation function will be reduced, where the autocorrelation function of the pure white noise with a flat frequency response is 0. 1/f noise that has a long time constant behaves like a fixed pattern noise and can be cancelled by CDS in time domain. The high frequency portion of the white noise is reduced by averaging. In order to reduce the residual noise and increase the overall frame signal-to-noise ratio (S/N), it is necessary to maintain the signal magnitude of pixels with high correlation factor, while attenuating pixel signals with low correlation factors. If the signals are amplified, less gain is assigned to the latter.

The post signal processing utilizing filters like Wiener filter can further reduce the noise. The signal with embedded noise is converted to a frequency domain by a Fourier transform, and the autocorrelation of the noise estimate is calculated by Fourier transform. These values are converted back to time domain by the Inverse Fourier Transform and used to calculate the filter coefficient. An expected or estimated output is compared with the output of a filter and the error is observed. This error is then minimized by adjusting the filter coefficient. One of the algorithm used to find the next coefficient can be LMS (Least Mean Square), that is, coefficients are changed to minimize the mean square error between the filtered output and the input signals coupled with noise.

The autocorrelation signal processing and filtering is done in the companion image processor which is advantageous since modern digital signal processing can be done fairly cheaply and with high performance (density, power and speed). Furthermore, since all the signals transferred and processed beyond the pixel are in the digital domain when using pixel-level ADC, they are immune to additional noise coupling (assuming the signal transfers out of the imager chip to the signal processor or equivalent are error free).

The multiple frame data received by the image processor are averaged pixel by pixel from frame to frame to remove the temporal noise. Images are smoothed by spatial low pass filtering along with the edge sharpening process where the high frequency component is maintained. For the multiple reference black columns, the IR is blocked so that the output simply represents the microbolometer resistance that varies with the background temperature and heat conduction.

In a system with the pixel-level ADC, track-and-store and comparator operations for all pixels can be done at the same time, thereby providing global shutter capability. The pixel-level comparator 475 changes state when the input voltage passes the DAC voltage threshold. At that instant, the corresponding digital input data to DAC is buffered, then stored in the frame buffer 691, and the status flag is set to indicate the completion of conversion of that pixel. The ADC operation is continued until the full range of DAC output is compared with the stored voltage and all pixel status bits are set for completion.

Since a global shutter captures and stores an instantaneous image, it is useful in capturing scenes containing motion without image artifacts that are characteristic of sensor arrays using a rolling shutter. If rows of pixels in an array are sampled at different times (as in column-level ADC), fast moving objects can exhibit phenomenon such as wobble, skew, smear, partial exposure, and aliasing that degrade image quality and can cause image processing algorithms to fail. Furthermore, the dynamic range expansion methods discussed earlier can only be implemented when using global shutter since it requires determining the full brightness range of an image at one instance in time. Global shutter can be implemented using two different methods: the first uses global sampling and storage of analog voltages along with serial processing in array-level or column-level ADC system; the second uses pixel-based operations where the ADC operation is done globally for all pixels at the same time.

In the array-level and column-level ADC system, the ADC operation is performed pixel by pixel or row by row sequentially (i.e. one pixel or row at a time). In order to implement a global shutter, it is necessary to sample and store all the pixels at the same time. However, since there is a time lag between one ADC operation to the next, variation of the individual capacitance value, large leakage and coupling of thermal noise of the switching transistor are problematic. Because the transistor threshold mismatch and capacitance variation are usually in a fixed pattern, the noise can be cancelled by the CDS operation previously described. However, the leakage cannot be filtered with CDS. Moreover, if the time lag between the first and last ADC operations is large, the leakage will considerably affect overall system performance.

With pixel-level ADC, the whole array only requires one ADC time, although a readout time is required per row. Since readout time is done digitally, precise settling of bit line voltage is not necessary and the time to complete whole frame readout, compared to the ADC conversion time per pixel or row, can be orders of magnitude shorter than in the system with array and column-level ADCs.

As the IR imager cost approaches that of a visible image sensor, with improved resolution and image quality, as well as high frame rate capture and global shutter capability, new possible applications emerge. One such application is gesture recognition. Existing technologies either rely on time-of-flight or the emission of near-IR laser dots to recognize 3D structure. These technologies require a light source that is invisible to the human eye at wavelength in the 850-950 nm range. Although these technologies perform well, the light source consumes significant power. High illumination intensity is often needed to provide adequate signal-to-noise ratio. When the ambient brightness is high, the system often requires a cooling fan. Also high light intensity in the visual band can bloom or smear into the Near IR band, deteriorating the image quality and necessitating visible light filtering components.

In contrast, a microbolometer IR sensor is passive, relying on the detection of distinct infrared radiation emitted by warm objects; therefore, it does not require an external light source and is suitable for low power portable devices. In a typical scene, the human body temperature is usually easily distinguishable from the background, because the body temperature of a person is relatively constant and uniform around 37 deg C. and the emissivity of the bare skin is approximately 0.98. This is true for both indoor and outdoor imaging. Especially the exposed body parts like hands or a face can be readily isolated and identified from the background and the detailed motion can be analyzed. An easier and preferred way of analyzing the motion is to use the symbolic presentation instead of three dimensional (3D) image reconstructed from the time-of-flight methods. As image quality improves and more detailed images become available, temperature contour maps and data points such as finger tips or valleys in between fingers can be extracted, as done in facial or finger print recognition systems, and used for 3D analysis. Using these symbolic lines and points along with a fast frame capture, the 3D motion tracking can be done without costing too much memory space, power and computation time.

The imaging array and processing electronics described above are combined with the optical elements and control electronics to form the optical imaging systems such as cameras for imaging applications in the infrared spectral range.

Those skilled in the art will recognize that disclosed design, architecture, and implementation of readout integrated circuits can be applied to a multitude of devices that require readout of an array of sensing elements.

What is claimed is:

1. A readout integrated circuit comprising:
   a resistive sensing element;
   a constant voltage source;
   integration and storage capacitors controlled for simultaneous signal acquisition and recording;
   an analog to digital converter; and
   a control logic,
   wherein the resistive sensing element is monolithically integrated above the remaining parts of the readout integrated circuit.

2. The readout integrated circuit of claim 1 further comprising:
   a source follower;
   a comparator;
   a storage element.

3. The integration capacitor of claim 1 whose voltage is sampled without affecting the charge accumulation process.

4. The resistive sensing element of claim 1 that is changing its resistance according to intensity of electromagnetic radiation.

5. An array of the readout integrated circuit of claim 1 further comprising memory registers containing compensation factors for the sensing elements to adjust for sensor to sensor variation.

6. An array of the readout integrated circuit of claim 1 further comprising memory registers containing compensation factors to interpolate between nonfunctional elements.

7. An array of the readout integrated circuits of claim 1 further comprising optical elements.

8. An array of the readout integrated circuit of claim 1 further comprising optical elements, an image processor and algorithms for motion tracking and gesture recognition.

9. An array of the readout integrated circuits of claim 1 further comprising an image processor to improve image quality and reduce noise.

10. An array of the readout integrated circuits of claim 1 further comprising control electronics to enable correlated double sampling to cancel fixed pattern noise.

11. An array of the readout integrated circuits of claim 1 further comprising control electronics to enable global shutter function.

12. A readout integrated circuit comprising:
    a resistive sensing element;
    a constant current source;
    storage and read hold capacitors controlled for simultaneous signal acquisition and recording;
    an analog to digital converter; and
    a control logic,
    wherein the resistive sensing element is monolithically integrated above the remaining parts of the readout integrated circuit.

13. The readout integrated circuit of claim 12 further comprising:
    a source follower;
    a comparator;
    a storage element.

14. The resistive sensing element of claim 12 that is changing its resistance according to intensity of electromagnetic radiation.

15. An array of the readout integrated circuit of claim 12 further comprising memory registers containing compensation factors to interpolate between nonfunctional elements.

16. An array of the readout integrated circuits of claim 12 further comprising optical elements.

17. An array of the readout integrated circuits of claim 12 further comprising optical elements, an image processor and algorithms for motion tracking and gesture recognition.

18. An array of the readout integrated circuits of claim 12 further comprising an image processor to improve image quality and reduce noise.

19. An array of the readout integrated circuits of claim 12 further comprising control electronics to enable correlated double sampling to cancel fixed pattern noise.

20. An array of the readout integrated circuits of claim 12 further comprising control electronics to enable global shutter function.

* * * * *